(12) United States Patent
Da Costa

(10) Patent No.: US 8,794,060 B2
(45) Date of Patent: Aug. 5, 2014

(54) ACCUMULATOR PISTON POSITION-MEASURING DEVICE

(75) Inventor: Arlindo Da Costa, Houilles (FR)

(73) Assignee: Eaton SAS, Coignieres (FR)

( * ) Notice: Subject to any disclaimer, the term of this patent is extended or adjusted under 35 U.S.C. 154(b) by 418 days.

(21) Appl. No.: 13/122,905

(22) PCT Filed: Oct. 8, 2009

(86) PCT No.: PCT/EP2009/063091
§ 371 (c)(1),
(2), (4) Date: Apr. 6, 2011

(87) PCT Pub. No.: WO2010/040800
PCT Pub. Date: Apr. 15, 2010

(65) Prior Publication Data
US 2011/0197658 A1 Aug. 18, 2011

(30) Foreign Application Priority Data
Oct. 8, 2008 (EP) .................................... 08290950

(51) Int. Cl.
*G01F 17/00* (2006.01)

(52) U.S. Cl.
USPC ........................................ 73/149; 340/870.36

(58) Field of Classification Search
CPC ............... F15B 15/283; F15B 15/2815; F15B 2201/31; F15B 2201/4056; F15B 2201/515
USPC ........................................................... 73/149
See application file for complete search history.

(56) References Cited

U.S. PATENT DOCUMENTS

| 2,074,959 | A | | 3/1937 | Rainford |
| 2,241,665 | A | | 5/1941 | Herman |
| 3,456,673 | A | | 7/1969 | Legrand |
| 4,016,732 | A | * | 4/1977 | Merkle ............................ 66/163 |
| 5,024,250 | A | | 6/1991 | Nakamura |
| 7,117,740 | B2 | * | 10/2006 | Reinis .............................. 73/321 |
| 7,290,476 | B1 | * | 11/2007 | Glasson ........................... 92/5 R |

FOREIGN PATENT DOCUMENTS

| DE | 4438166 A1 | 5/1996 |
| FR | 2628155 A | 9/1989 |
| JP | 54138966 A | 10/1979 |
| WO | WO 01/77530 A | 10/2001 |

OTHER PUBLICATIONS

Author: Alan Hitchcox, Title: Sensor monitors energy contained in accumulators, Date: Sep. 14, 2009, Publisher: Hydraulics & Pneumatics, pp. 2.*

(Continued)

*Primary Examiner* — Lisa Caputo
*Assistant Examiner* — Roger Hernandez-Prewit
(74) *Attorney, Agent, or Firm* — Dykema Gossett PLLC

(57) ABSTRACT

A hydraulic accumulator including a fluid chamber and a displaceable piston that is connected to a piston position-measuring means is disclosed. Embodiments of the hydraulic accumulator can provide a device that measures the available fluid volume in the accumulator. In embodiments, the displaceable part of the piston may separate fluid volume from gas volume, and may be connected to a wire that runs through the fluid volume and exits the outside of the accumulator through a sealed opening. Further, in embodiments, the wire may be led over pulleys and through a hollow member connected to the accumulator. The position of an associated metallic core member can be electrically monitored to provide position and fluid volume information.

15 Claims, 3 Drawing Sheets

(56) References Cited

OTHER PUBLICATIONS

Author: Chris Grosenick, Title: Accumulators: Hydraulic energy storage, Date: Apr. 1, 2003, Publisher: AVIATIONPROS.COM, pp. 3.*

Author: Unknown, Title: Hydraulic Piston Accumulators, Date: 2001, Publisher: HYDAC International, pp. 1-19.*

European Patent Office, International Search Report and Written Opinion from corresponding PCT Application No. PCT/EP2009/063051, filed Oct. 8, 2009. Date of Mailing of Report: Jan. 14, 2010.

* cited by examiner

ACCUMULATOR PISTON POSITION-MEASURING DEVICE

CROSS-REFERENCE TO RELATED APPLICATIONS

This application is a national stage filing based upon International PCT Application No. PCT/EP2009/063091, with an international filing date of Oct. 8, 2009, which claims the benefit of priority to European Application No. 08290950.8, filed Oct. 8, 2008, each of which applications are fully incorporated herein by reference as though fully set forth herein.

FIELD OF THE INVENTION

The present invention relates to an accumulator piston position-measuring device.

BACKGROUND

Energy accumulators are often used in systems, where a very high energy is necessary to be released for relatively short periods, and where the system has thereafter plenty of time to recharge the accumulator for the next release of high energy. Alternatively, they are also used for back-up purposes of hydraulic systems, where deficiencies like leakage may occur.

A typical example thereof is the landing gear braking systems of airplanes, where accumulators are known to be used for static braking of the landing gear, while on the ground, but also in some instances, for directly assisting braking itself.

In modern, often mobile, hydraulic systems the preferred item is a gas charged accumulator, but simple systems may be spring-loaded.

Other than for the security aspect of a back-up system an accumulator is typically used to be placed close to the pump with a non-return valve preventing flow back to it, in the best place to absorb pulsations of energy from the multi-piston pump. It also helps protect the system from fluid hammer. This protects system components; particularly pipe work, from both potentially destructive forces.

An additional benefit is the additional energy that can be stored while the pump is subject to low demand. The designer can use a smaller-capacity pump. The large excursions of system components, such as landing gear on a large aircraft, that require a considerable volume of fluid can also benefit from one or more accumulators. These are often placed close to the demand to help overcome restrictions and drag from long pipe work runs. The outflow of energy from a discharging accumulator is much greater, for a short time, than even large pumps could generate.

An accumulator can maintain the pressure in a system for periods when there are slight leaks without the pump being cycled on and off constantly. When temperature changes cause pressure excursions the accumulator helps absorb them. Its size helps absorb fluid that might otherwise be locked in a small fixed system with no room for expansion due to valve arrangement.

The gas pre-charge in an accumulator is set so that the separating bladder, diaphragm or piston does not reach or strike either end of the operating cylinder. The design pre-charge normally ensures that the moving parts do not foul the ends or block fluid passages. Poor maintenance of pre-charge can destroy an operating accumulator. A properly designed and maintained accumulator should operate trouble-free for years.

Although typically advantageous for aircrafts, the invention may be applied to a variety of energy consuming systems or more generally to any gas or liquid storage system, and will be exposed in the following description with reference to a hydraulic accumulator for the landing gear braking systems of airplanes, without being limited thereto.

International aviation security regulations an guidelines such as FAA or ESAS require, that the available energy stored in the accumulator such as for the braking fluid volume for braking the landing speed of an airplane down to taxiing speed, or for any other hydraulic system on board, must be constantly monitored and displayed to the pilot, in order to assure, that the pilot may take the necessary measures if the available energy for whatever system is not assured.

The braking of an airplane takes a considerable volume of braking fluid, and in order to provide this fluid in the required time to the brakes, one must either use an appropriately dimensioned fluid pump, which stays inactive for long periods of time, or use a smaller pump, which is just capable of accumulating the fluid under the required pressure in the accumulator during relatively long periods of non-use of the accumulator.

SUMMARY

It is therefore an of the present disclosure to provide a braking fluid accumulator for an airplane with a very reliable, electro-mechanical means to permit the pilot to constantly survey the energy reserve held by the accumulator.

The above-identified object may be attained with a hydraulic accumulator as mentioned above, which may comprise a piston connected to a piston position-measuring means.

According to a preferred embodiment of the invention, the hydraulic accumulator is characterized in that it further includes a housing, having a cylindrical inner space to store fluid under pressure said fluid being stored within the housing to be at least partially released subsequent to the activation of a release control valve, a piston or membrane being arranged within said inner space and comprises a partition wall which delimits a first volume for pressurized fluid, and a second volume for pressurized gas, said partition wall being capable of being displaced within said cylindrical inner space in axial direction, in response to any change of volume of fluid in said first room, wherein said hydraulic accumulator comprises an electro-mechanical piston-position measuring means.

In a hydraulic accumulator of this type said partition wall may be connected to one end of a wire and that wire may be lead through a sealed opening to the outside of said housing, and the other end of said wire may be connected to a wire pick-up device.

Further, in this hydraulic accumulator, said piston-position measuring means may further include a longitudinal hollow means such as an LVDT (longitudinal variable differential transformer), which may longitudinally house said wire so as to permit that said wire longitudinally slides within said longitudinal means in response to a displacement of said partition wall.

The said wire may carry a core element, which is positioned within said longitudinal means (LVDT) and which may slide longitudinally within said longitudinal means together with the wire.

The accumulator may further comprise an electric sensor for the longitudinal position of said core element within said longitudinal means.

The wire pick-up device of an accumulator according to the invention may be of the spring-pulley type, the spring force of which being adapted to maintaining said wire continuously in tension.

The longitudinal means (LVTD) may be arranged outside of said housing close to said housing and parallel thereto.

In an arrangement of a piston position-measuring device according to the present invention, the wire, one of its ends, may be fastened to said partition wall, may further extend through an axially positioned sealed opening of said housing close to a hydraulic valve of said accumulator.

The piston-position measuring device in an accumulator according to the present invention may comprise two pulleys, the first one in order to guide the wire after axially exiting from the housing into a direction substantially perpendicular, i.e. radially, away from an axis of said housing, and the second one in order to change the direction of the wire again to be parallel to the axis of the housing, but opposite to the direction of the wire before the first pulley. The wire (6) may also be attached to said partition wall on the fluid side of the partition wall, and be lead through the fluid volume to said sealed opening, thus providing automatic lubrication of the wire.

Furthermore, such an arrangement allows the position of the partition wall (or separator element) to be measured using a system that allows the gas side of the partition wall to be hermetically sealed. In turn this allows for the manufacture of a hydraulic accumulator device in which the gas side is factory charged and maintenance free.

The invention also relates to a method for measuring the volume of liquid under pressure in a hydraulic accumulator, whereby this method comprises the steps of providing a hydraulic accumulator as described above, reading the measured value of the position of the core element, and communicating the measured value to an operator.

The hydraulic accumulator of the present invention may be used in an aircraft, and particularly in a braking system of the landing gear of an aircraft.

BRIEF DESCRIPTION OF THE DRAWINGS

The invention will be better understood with reference to the drawing, drawings.

DETAILED DESCRIPTION OF THE INVENTION

Figure 1:
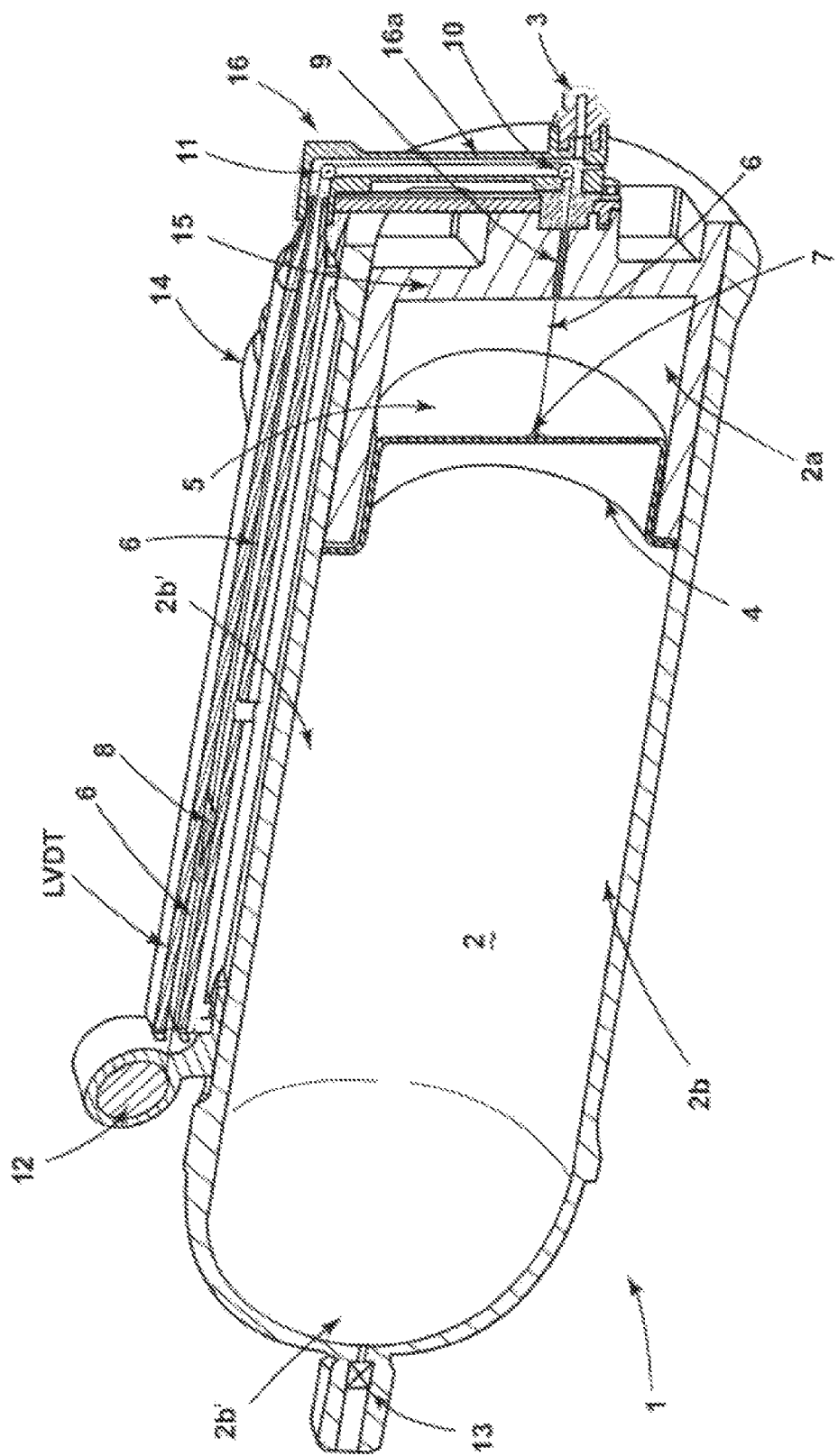
FIG. 1 generally illustrates a hydraulic accumulator according to an embodiment of the present disclosure.

FIG. 1 depicts a hydraulic accumulator according to the present disclosure, which includes a housing 1, enclosing an inner space 2.

This inner space 2 is comprised of two portions 2a and 2b that are separated by a partition wall 5 of a piston 4.

Inner space 2b has a cylindrical main portion 2b,' and a dome—like end portion 2b", which is closed by a service valve unit 13.

Inner space portion 2a is of cylindrical shape, and delimited by two radially extending walls, partition wall 5 and end wall 15 of the accumulator.

Figure 2:
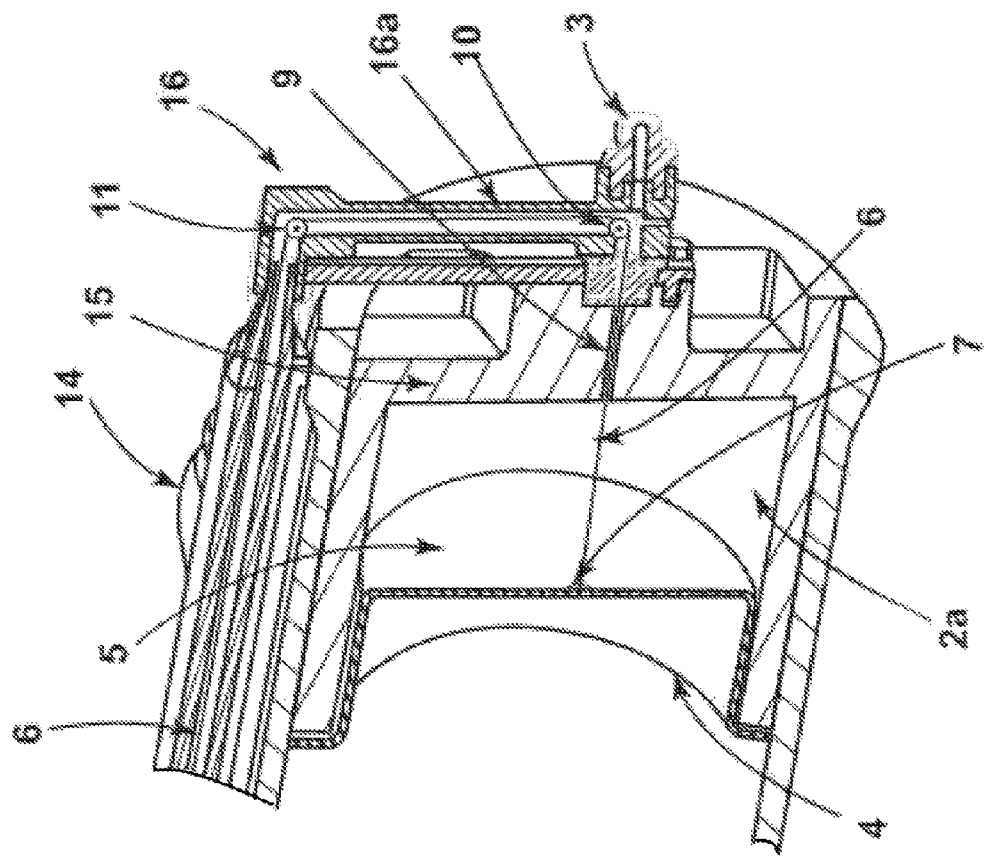
FIG. 2 generally illustrates a sectional view of an end portion of the hydraulic accumulator shown in FIG. 1.

In an embodiment of the present disclosure, as generally shown in FIG. 2, partition wall 5, on its side facing space 2a, carries on an end of a wire 6 with the help of any appropriate fasten means, which is not illustrated in any detail, but the location of which is designated with reference numeral 7. The wire 6 extends axially through space 2a, and exits from the space through a sealed opening 9, it being understood, that this opening may also be executed without any seal, provided that there is another seal somewhere further down the wire trajectory before the exit of the wire into the outside environment.

Since the wire extends all the way through the fluid space 2a, it is in constant contact with the hydraulic fluid, which has, generally, also lubricant properties.

Alternatively, opening 9 may be a simple though hole without any sealing arrangement, and the sealing arrangement may be provided at any appropriate location within the hydraulic connection 3, that terminates the accumulator axially outside of the end wall 15 of the accumulator.

Fastened to the hydraulic connection 3 is a rod unit 16, which include at least one hollow rod 16a, through which runs wire 6 after having exited from the housing 1.

This rod unit 16 comprises two pulleys 10 and 11, which serve to guide the wire 6 in a way as to be led away from the axis of the accumulator after exiting from opening 9, and for returning thereafter into an ax-parallel direction outside of the accumulator housing 1 in a direction opposite to the direction, that it extends into, within the accumulator.

After having been returned into the ax-parallel direction again by pulley 11, the wire 6 runs through a hollow cylindrical longitudinal body, an LVDT, the operation of which is known and will only be referred to herein in general terms.

Figure 3:
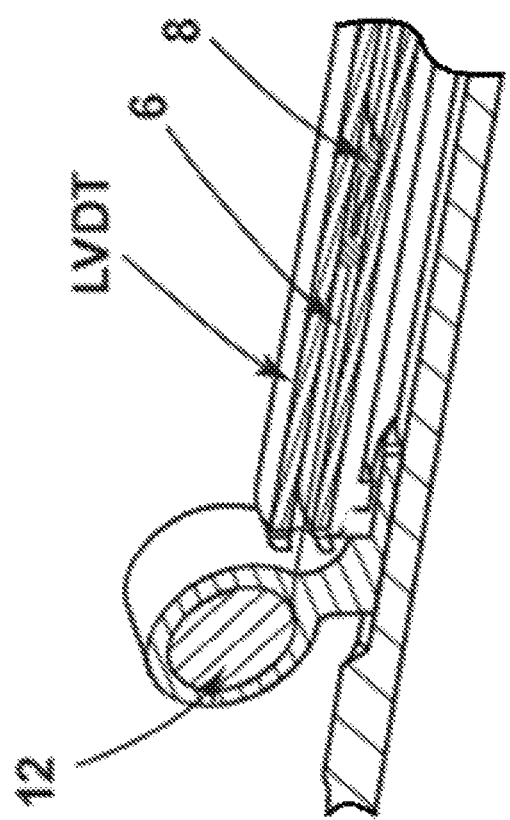
FIG. 3 generally illustrates an enlarged sectional view of a LVDT of the hydraulic accumulator shown in FIG. 1.

In an embodiment of the present disclosure, as generally shown in FIG. 3, at the end of the LVDT opposite its side of entry of the wire is arranged a spring and pulley-type wire pick-up means 12, which is capable of storing and yielding a wire length that corresponds to the distance of possible displacement of the partition wall 5 within the accumulator housing 1 in response to a release or recharging of fluid into space 2a.

Fixed on the wire within the LVDT is a metallic core 8, in a position such as to move between two extreme positions within the LVDT, that correspond to the maximum displacement positions of the partition wall 5 corresponding to the fully charged and the fully discharged condition of the accumulator, respectively of the space 2a.

A known manner, the LVTD comprises a plurality of non-illustrated electrical coils which surround the trajectory of the core 8, the arrangement being such that the electrical impact of the magnetic field within the coils changes according to the actual position of the core 8 between its two end positions, and the coils are electrically connected to an electric terminal 14.

It is readily understandable, that any movement of the partition wall 5 will be transmitted to the wire 6 and further to the core 8, and an electrical signal is obtained, that depends exactly on the longitudinal position of the core 8 within the LVDT, and thus, on the position of the partition wall 5.

Space 2a inside the hydraulic accumulator may be charged with a hydraulic liquid by a non-illustrated pump, until a maximum pressure, and during this charging of liquid into space 2a, partition wall 5 moves in a way as to increase space 2a in proportionality to the volume of the charged liquid, and at the same moment, space 2b diminishes and the pressure of a gas, that is hermetically enclosed in space 2b, increases.

The charging operation of the accumulator is terminated, when the pressure in the gas room 2b, which is, of course, substantially identical to the pressure in the fluid room 2a, reaches a predetermined value.

Whenever the fluid under pressure within the accumulator is required for any action by the operator, the pilot of an airplane or the like, fluid is released from the accumulator though hydraulic connection 3, which may include an electro-valve itself, or simply lead to an electro-valve.

When fluid is released from the accumulator, partition wall 5 moves under the pressure of the gas in space 2b so as to decrease the volume of the fluid space 2a, and this movement is communicated by means of wire 6 to the core 8, and measured by the electrical components of the LVDT.

The purpose and the type of employment of the described and discussed hydraulic accumulator is not part of the present invention, the latter relating solely to the described way of measuring the degree of charge of the accumulator through measuring the position of the partition wall 5.

Generally, the skilled person simply refers to the position of the piston, rather that to the position of the partition wall, indeed, many different types of pistons, bladders, bellow-types of separation elements between the two spaces may be used. Also, the present invention, although described herein above, with reference to a gas pressure type of accumulator, is also applicable to a spring-type accumulator or else, the matter of interest is the measurement of the separation element, and not the type of force, against which the pump must work when charging the accumulator.

The invention has been described herein above with reference to a typical embodiment, without being limited thereto. Numerous modifications are possible without departing from the scope and spirit of the invention as defined by the following set of claims.

What is claimed is:

1. A hydraulic accumulator comprising:
   a fluid chamber;
   a displaceable piston having a partition wall which separates the fluid chamber into a first volume for accumulating pressurized fluid and a second volume for holding pressurized gas, said partition wall capable of being displaced within the fluid chamber in an axial direction, wherein said piston is connected to a piston position-measuring means, which includes a wire attached at one end thereof to the partition wall on the pressurized fluid side, and the wire is led through the first volume of pressurized fluid and exits the hydraulic accumulator through a sealed opening, and wherein the second volume of pressurized gas is hermetically sealed.

2. The hydraulic accumulator of claim 1, including a housing having a cylindrical inner space to store fluid under pressure said fluid being stored within the housing to be at least partially released subsequent to the activation of a release control valve, said partition wall being capable of being displaced within said cylindrical inner space in axial direction, in response to any change of volume of fluid in said first volume, wherein said hydraulic accumulator comprises an electro-mechanical piston-position measuring means.

3. The hydraulic accumulator of claim 2, wherein said partition wall is connected to one end of the wire, the other end of said wire being connected to a wire pick-up device.

4. The hydraulic accumulator of claim 3, wherein said piston-position measuring means further includes a longitudinal hollow means, which longitudinally houses said wire so as to permit that said wire longitudinally slides within said longitudinal means in response to a displacement of said partition wall.

5. The hydraulic accumulator of claim 4, wherein said wire carries a core element, which is positioned within said longitudinal means and which slides longitudinally within said longitudinal means together with the wire.

6. The hydraulic accumulator of claim 5, wherein the hydraulic accumulator further comprises an electric sensor for the longitudinal position of said core element within said longitudinal means.

7. The hydraulic accumulator of claim 4, wherein said longitudinal means is arranged outside of said housing close to said housing and parallel thereto.

8. The hydraulic accumulator of claim 7, wherein said wire, starting from its one end, which is fastened to said partition wall, extends through an axially positioned sealed opening of said housing close to a hydraulic valve of said accumulator.

9. The hydraulic accumulator of claim 7 wherein said piston-position measuring device comprises two pulleys, the first pulley configured to guide the wire after axially exiting from the housing into a direction substantially perpendicular, i.e. radially, away from an axis of said housing, and the second pulley configured to change the direction of the wire again to be parallel to the axis of the housing, but opposite to the direction of the wire before the first pulley.

10. The hydraulic accumulator of claim 3, wherein said wire pick-up device is of the spring-pulley type, the spring force of which being adapted to maintaining said wire continuously in tension.

11. The hydraulic accumulator of claim 3, wherein the second volume for pressurized gas includes a service valve unit.

12. The hydraulic accumulator of claim 3, wherein the wire is automatically lubricated by being lead through the first volume.

13. A method to measure the volume of liquid under pressure in a hydraulic accumulator, comprising:
    providing a hydraulic accumulator having a fluid chamber and a displaceable piston having a partition wall which separates the fluid chamber into a first volume for accumulating pressurized fluid and a second volume for holding pressurized gas, said partition wall capable of being displaced within the fluid chamber in an axial direction, the displaceable piston connected to a piston position-measuring device, which includes a wire attached at one end thereof to the partition wall on the pressurized fluid side, and the wire is led through the first volume of pressurized fluid and exits the hydraulic accumulator through a sealed opening, and wherein the second volume of pressurized gas is hermetically sealed;
    reading the measured value of the position of the core element; and
    communicating the measured value to an operator.

14. The method of claim 13, wherein the hydraulic accumulator is provided in an aircraft.

15. The method of claim 13, wherein the hydraulic accumulator is provided in a braking system of landing gear of an aircraft.

* * * * *